(12) United States Patent
Hoffman

(10) Patent No.: US 11,756,447 B1
(45) Date of Patent: Sep. 12, 2023

(54) SYSTEM FOR TEACHING MUSIC NOTATION AND ASSOCIATED METHOD OF USE

(71) Applicant: Christine Hoffman, The Villages, FL (US)

(72) Inventor: Christine Hoffman, The Villages, FL (US)

( * ) Notice: Subject to any disclaimer, the term of this patent is extended or adjusted under 35 U.S.C. 154(b) by 0 days.

(21) Appl. No.: 17/472,855

(22) Filed: Sep. 13, 2021

(51) Int. Cl.
  *G09B 15/02* (2006.01)
  *G10H 1/36* (2006.01)
  *G10H 1/00* (2006.01)

(52) U.S. Cl.
  CPC ......... *G09B 15/023* (2013.01); *G10H 1/0016* (2013.01); *G10H 1/0066* (2013.01); *G10H 1/368* (2013.01)

(58) Field of Classification Search
  CPC .. G09B 15/023; G10H 1/0016; G10H 1/0066; G10H 1/386
  See application file for complete search history.

(56) References Cited

U.S. PATENT DOCUMENTS

| | | | | |
|---|---|---|---|---|
| 5,496,179 A | * | 3/1996 | Hoffman | G09B 15/04 84/479 A |
| 5,540,132 A | * | 7/1996 | Hale | G09B 15/04 434/428 |
| 6,831,220 B2 | * | 12/2004 | Varme | G10G 1/00 84/464 R |
| 6,870,085 B2 | * | 3/2005 | MacCutcheon | G09B 15/023 84/477 R |
| 7,414,186 B2 | * | 8/2008 | Scarpa | G09B 15/08 84/478 |
| 7,514,622 B2 | | 4/2009 | Yoshikawa | |
| 7,521,619 B2 | * | 4/2009 | Salter | G09B 15/00 84/485 R |
| 7,629,527 B2 | | 12/2009 | Hiner et al. | |
| 7,843,471 B2 | | 11/2010 | Doan et al. | |
| 8,686,268 B1 | * | 4/2014 | Young | G09B 15/02 84/470 R |
| 8,773,389 B1 | | 7/2014 | Freed | |
| 8,835,736 B2 | * | 9/2014 | Parks | A63F 13/44 84/484 |
| 9,269,276 B2 | | 2/2016 | Dupree | |
| 9,485,286 B1 | | 11/2016 | Sellier et al. | |
| 9,564,089 B2 | | 2/2017 | Kim | |
| 11,482,129 B2 | * | 10/2022 | Holczer-Waroquet | G09B 15/08 |
| 2002/0090985 A1 | | 7/2002 | Tochner et al. | |
| 2007/0089589 A1 | * | 4/2007 | Scarpa | G09B 15/08 84/478 |
| 2007/0089590 A1 | | 4/2007 | Katou | |
| 2012/0121195 A1 | | 5/2012 | Yadid et al. | |
| 2012/0198330 A1 | | 8/2012 | Koppel et al. | |
| 2021/0264807 A1 | * | 8/2021 | Holczer-Waroquet | G09B 15/008 |

\* cited by examiner

*Primary Examiner* — Robert W Horn
(74) *Attorney, Agent, or Firm* — Molly L. Sauter; Smith & Hopen, P.A.

(57) ABSTRACT

A system and method for teaching music notation through the use of animated characters and movable objects displayed on a visual display and enhanced with audible sounds representative of the movable objects. Non-movable objects are additionally provided to provide travel paths, or maps, for the movable objects on the visual display. The unique use of movable objects and audible sounds is shown to improve the learning outcome of users of the system.

28 Claims, 11 Drawing Sheets

© 1995 Christine Hoffman

© 1995 Christine Hoffman

© 1995 Christine Hoffman

© 1995 Christine Hoffman

© 1995 Christine Hoffman

© 1995 Christine Hoffman

© 1995 Christine Hoffman

© 1995 Christine Hoffman

SYSTEM FOR TEACHING MUSIC NOTATION AND ASSOCIATED METHOD OF USE

RESERVATION OF COPYRIGHT RIGHTS

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

Music notation refers generally to a system for visually represent aurally perceived music played with instruments or sung by the human voice through the use of written, printed, or otherwise-produced symbols. In other words, music notation is a way of writing down music so that anyone can play it on a musical instrument.

Commonly, musical notes are written on a music staff comprising five parallel lines with four spaces in between them. Writing musical notes on a music staff allows the music to be played or sung by anybody you can "read music". In the case of a keyboard-based instrument, such as a piano, learning to read music requires learning to associate specific keys of the piano with specific notes written on the music staff. More generally, an individual must learn the instrumentalities of a musical instrument that are used to produce the notes shown on the music staff.

The music notation learning tools currently known in the art assign stationary figures to individual keys of a piano or instrumental keyboard. However, the lack of mobility of the figures makes it difficult for a student to make a mental connection between musical note locations on a written music staff and the location of the keys related to the musical notes on the musical instrument.

However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for an improved system and method for teaching musical notation is now met by a new, useful, and nonobvious invention.

In various embodiments, the present invention provides a system and method for teaching users to read and play music through graphical, computer-based, devices using movable objects in combination with a display of real world objects in the field of music notation instruction.

In one embodiment, the present invention provides a method of teaching music notation to a user which includes, displaying a musical instrument image and a musical staff image on a visual display of an electronic device, displaying an animated character on the visual display, wherein the animated character is associated with a musical note and displaying a movable object associated with the animated character on the visual display. The method further includes, displaying a movement of the movable object to a location on the musical instrument image that is associated with the musical note, transforming the movable object into an animated music note comprising the movable object and displaying a movement of the animated music note to a location on the musical staff image that is associated with the musical note.

In an additional embodiment, the method may further include playing an audible sound during the movement of the movable object, wherein the audible sound is representative of the movable object and is not the sound of the musical note. The audible sound may be played as the movable object is moving to a location of the musical staff image that is associated with the musical note. In addition, the audible sound may be played when the user activates the musical instruction, such as by depressing a key on a keyboard and plucking a string on a stringed instrument. It has been found that the audible sounds provided by the present invention may enhance the learning process for the user, for example a sound associated with a motorized truck or moving car, such as a beeping horn, may be provided in response to a user depressing an appropriate key on a keyboard when the vehicle arrives at its destination.

The method may further include, instructing a user to play, on a musical interface device coupled to the electronic device, the musical note indicated by the location of the animated character on the musical instrument image, receiving, at the electronic device, input from the musical interface device in response to the user playing the musical note on the musical interface device and in response to the input received from the musical interface device, displaying the movement of the movable object to the location on the musical instrument image that is associated with the musical note. In various embodiments, visual and audible commands may be used to provide instruction to the user.

In another embodiment, the present invention provides a music notation teaching apparatus which includes, an electronic device comprising at least a processor and a visual display. The apparatus further includes a computing memory coupled to the processor, the computing memory comprising executable instructions that upon execution by the processor cause the processor to effectuate operations comprising, displaying a musical instrument image and a musical staff image on the visual display of the electronic device, displaying an animated character on the visual display, wherein the animated character is associated with a musical note, displaying a movable object associated with the animated character on the visual display, displaying a movement of the movable object to a location on the musical instrument image that is associated with the musical note, transforming the movable object into an animated music note comprising the movable object and displaying a movement of the animated music note to a location on the musical staff image that is associated with the musical note.

In another embodiment, the present invention includes one or more non-transitory computer-readable media having computer-executable instructions for performing a method of running a software program on an electronic device. In this embodiment, the electronic device operates under an operating system and the method includes issuing instructions from the software program for displaying a musical instrument image and a musical staff image on a visual display of an electronic device, displaying an animated character on the visual display, wherein the animated character is associated with a musical note, displaying a movable object associated with the animated character on the visual display, displaying a movement of the movable object to a location on the musical instrument image that is associated with the musical note, transforming the movable object into an animated music note comprising the movable object and displaying a movement of the animated music note to a location on the musical staff image that is associated with the musical note.

As such, in accordance with the various embodiments of the present invention a music notation learning tool is provided that integrates visual mobility with stimulating audible sounds that are affective in helping students to make mental connections between musical note locations on a written music staff and the location of the keys related to the musical notes on the musical instrument.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In various embodiments, the present invention provides a system for teaching individuals to read notes on sheet music and to correlate the notes with image of a musical instrument, such as a keyboard, the fretted neck of a stringed instrument or the valves and openings of certain wind instruments. In an additional embodiment, touch screen technology may be used in the place of a keyboard, thereby allowing the individual to employ their fingers, a mouse, stylus, pencil, etc. to track the movement of the noise emitting movable musical object to a location on the musical instrument image or staff that is associated with the musical note.

Figure 1:
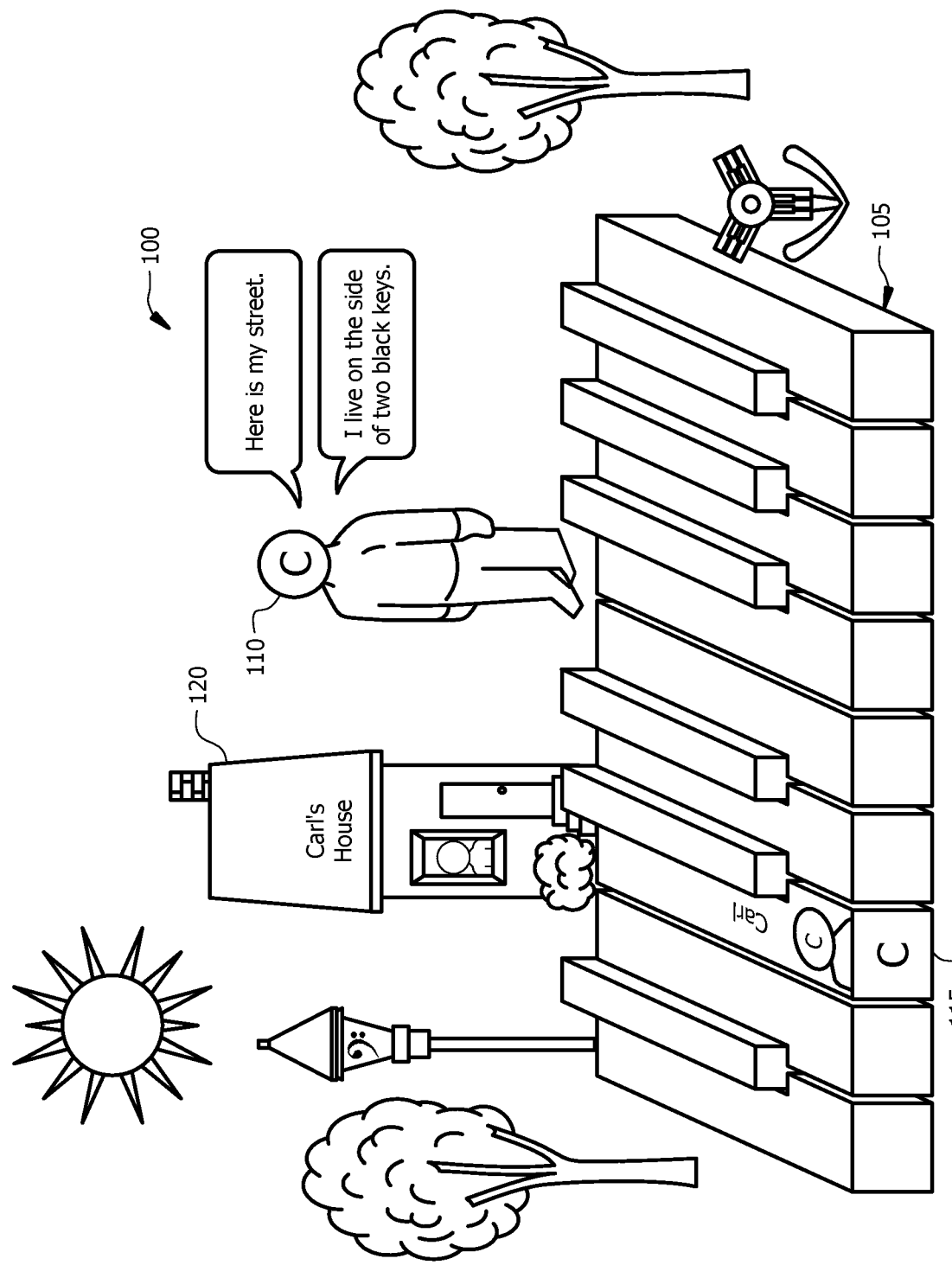
FIG. 1 is a diagram illustrating an embodiment of the present invention comprising an animated character and a musical instrument image on a visual display of an electronic device.

With reference to FIG. 1, in one embodiment of the invention, a musical instrument image 105 may be displayed on a visual display 100 of an electronic device. The electronic device may be one of many electronic devices known in the art include, desktop and lap computers, tablets, smart phones, video display devices, etc. Electronic devices within the scope of the present invention may further include a handheld electronic devices designed to be used for reading e-books and similar material, such as e-Readers. It is additionally envisioned that the electronic device may include a touch sensitive display for interactive with a user of the device. The inventive method may additional be provided via an XML or HTML interface over the internet using a Document Object Model (DOM).

In the currently described exemplary embodiment, the musical instrument 105 is a keyboard, however, this is not intended to be limiting and various other instruments, such as stringed instruments and wind instruments, may also be displayed as a musical instrument image 105 on the visual display 100 of the electronic device.

As shown in FIG. 1, the musical instrument image 105 is a keyboard that includes various keys, and in particular, the keyboard includes a key 115 associated with the musical "C" note. In addition to the musical instrument image 105, an animated character 110 is also displayed on the visual display 100 of the electronic device. In this embodiment, the animated character 110 is referred to as "Carl" on the visual display 100. A visual representation of Carl is also shown on the "C" key on the musical instrument image 105 of the keyboard. An image of Carl's House 120 is also shown on the visual display 100. Various other visual elements may be shown on the visual display 100, such as trees, flowers, light posts, etc. to create a virtual scene incorporating the musical instrument image 105. Additional visual prompts, such as "Here is my street" and "I live on the side of two black keys", may be added to the visual scene for enforce the physical location of the "C" note on the musical instrument image 105.

Figure 2:
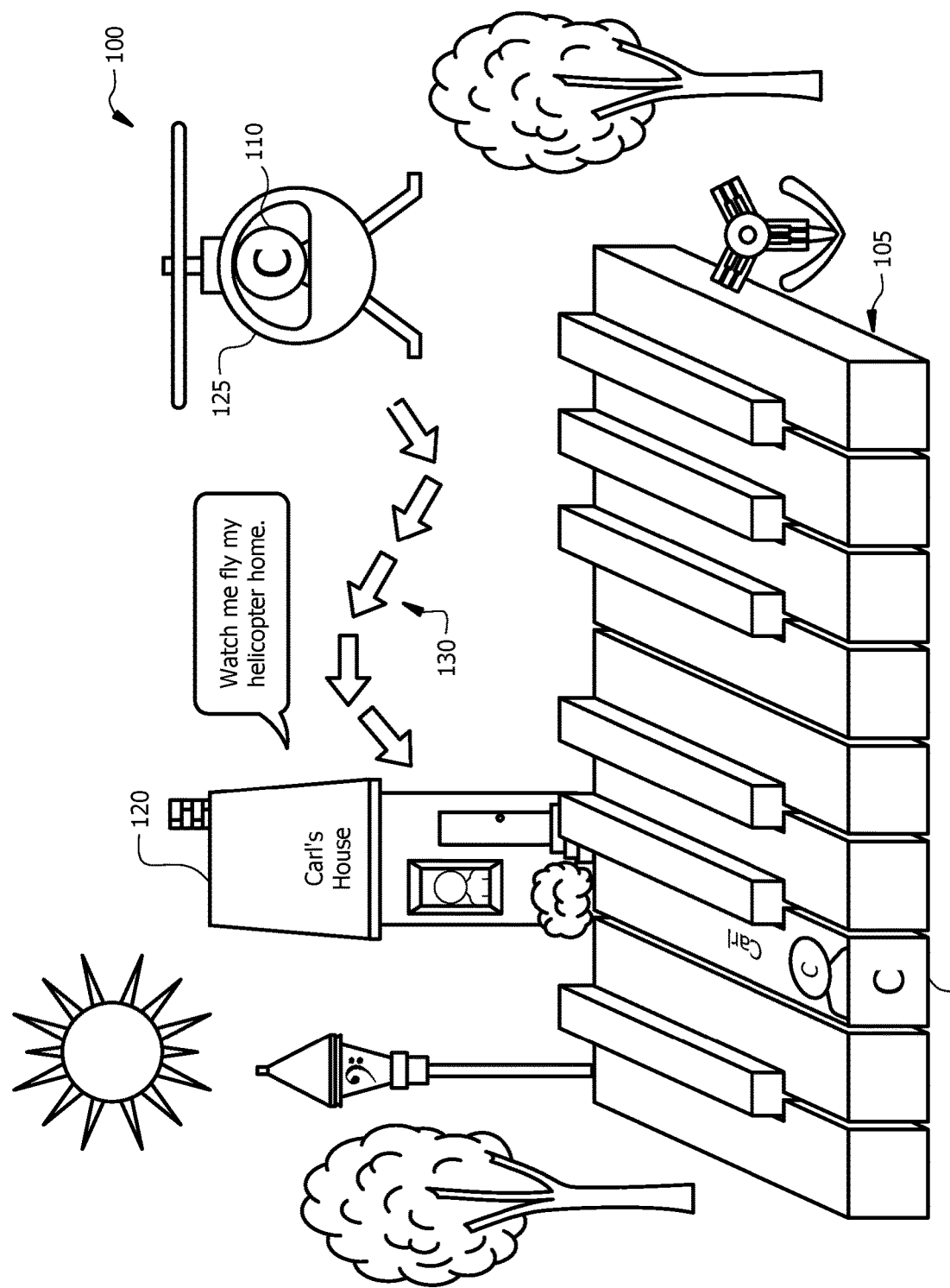
FIG. 2 is diagram illustrating an embodiment of the present invention comprising an animated character and a movable object associated with the animated character.

As shown in FIG. 2, the visual display 100 also includes a movable object 125 associated with animated character 110. In this embodiment, the movable object 125 is a helicopter and the animated character is Carl 110. In general, a movable object is associated with the animated character to represent one of the musical notes used to read music on the musical staff.

In the embodiment shown in FIG. 2, the movable object 125 is shown have a movement 130 from one location on the visual display 100 to a location on the musical instrument image 105 that is associated with the musical note 115. In this particular embodiment, the helicopter associated with Carl is flown across the visual display and lands at the key on the keyboard that represents the "C" note. This movement of the movable object is further emphasized with reference to FIG. 3, where the helicopter is shown moving through the virtual sky to land on the "C" key of the keyboard. In general, a movable object 125 displays a movement 130 to a location on the musical instrument image 105 that is associated with a key 115 that relates to a specific musical note. In a specific embodiment, the movable object 125 may be color coordinated with the associated positional key on the keyboard that represents the note.

In addition to the movement of the movable object 125 of the visual display 100, the electronic device additionally plays an audible sound during the movement 130 of the movable object. The audible sound may be produced using sound producing technology well known in the art and the audible sound may be emitted from one or speakers of the electronic device, which are also well known in the art.

Figure 3:
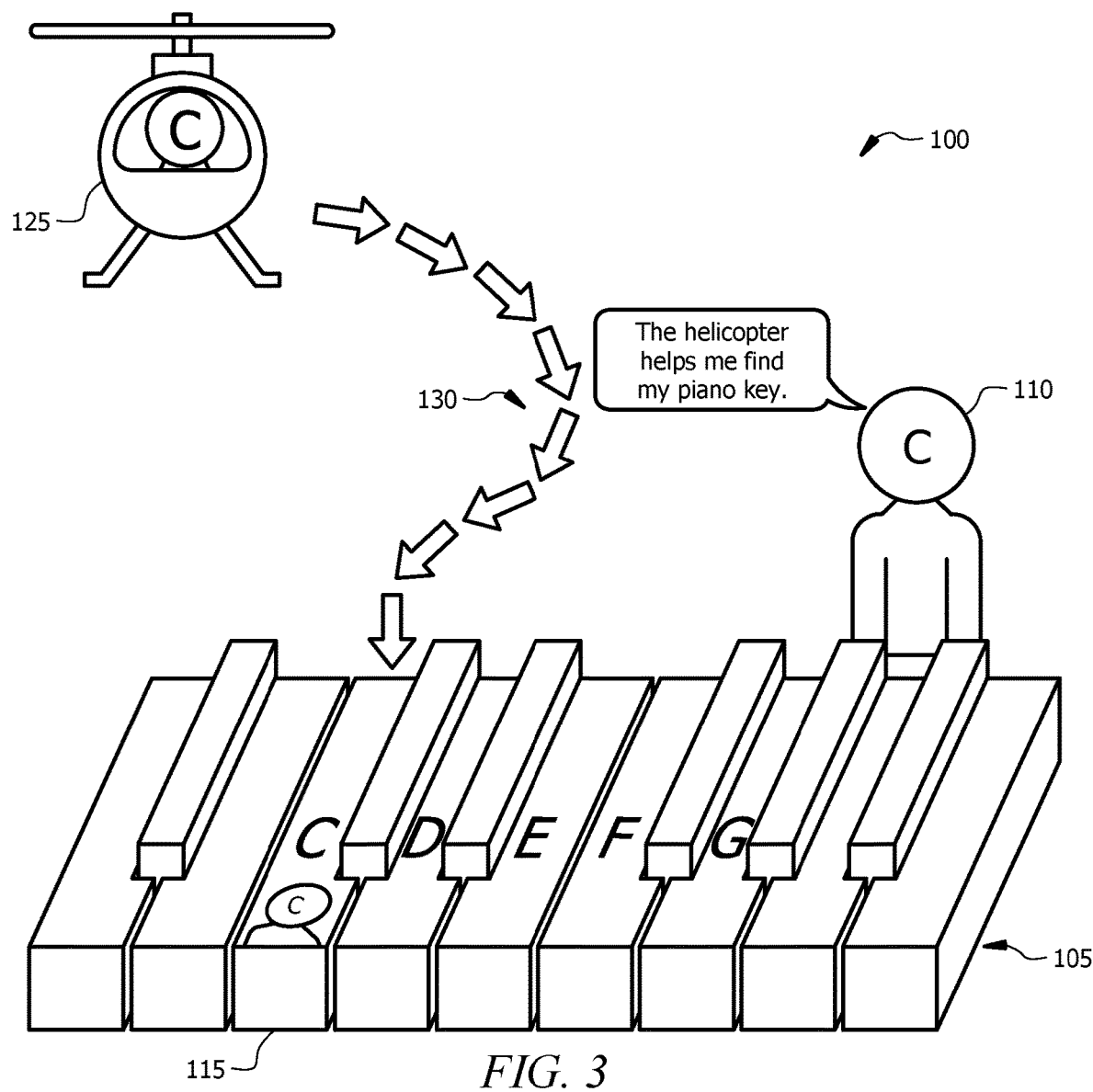
FIG. 3 is a diagram illustrating an embodiment of the present invention showing the movement of a movable object associated with the animated character to a related key on a musical instrument image.

In the present invention, the audible sound played during the movement 130 of the movable object 125 toward the musical instrument image 105 is not the sound associated with the musical note "C" played on a keyboard. Instead, the sound played during the movement of the movable object is a sound that is commonly associated with the movable object itself. As such, in the exemplary embodiment illustrated in FIG. 3, the audible sound played during the movement of the helicopter is a sound associated with the movement of a real helicopter, such as the whirling sound of the helicopter rotors. As shown in FIG. 3, the visual display may include additional visual clues, such as "The helicopter helps me find my piano key", attributed to the animated character 110 to further support the significance of the movement of the helicopter to the "C" key on the keyboard.

The use of a helicopter and associated whirling sounds of the helicopter rotors is not intended to be limiting and the keys of the musical instrument may additional be used to activate various other sounds, including, but not limited to beeping cars, train whistles, bike bells, various other transportation vehicles. Additionally, the emitted sounds may be in pitch with the positional music note.

Figure 4:
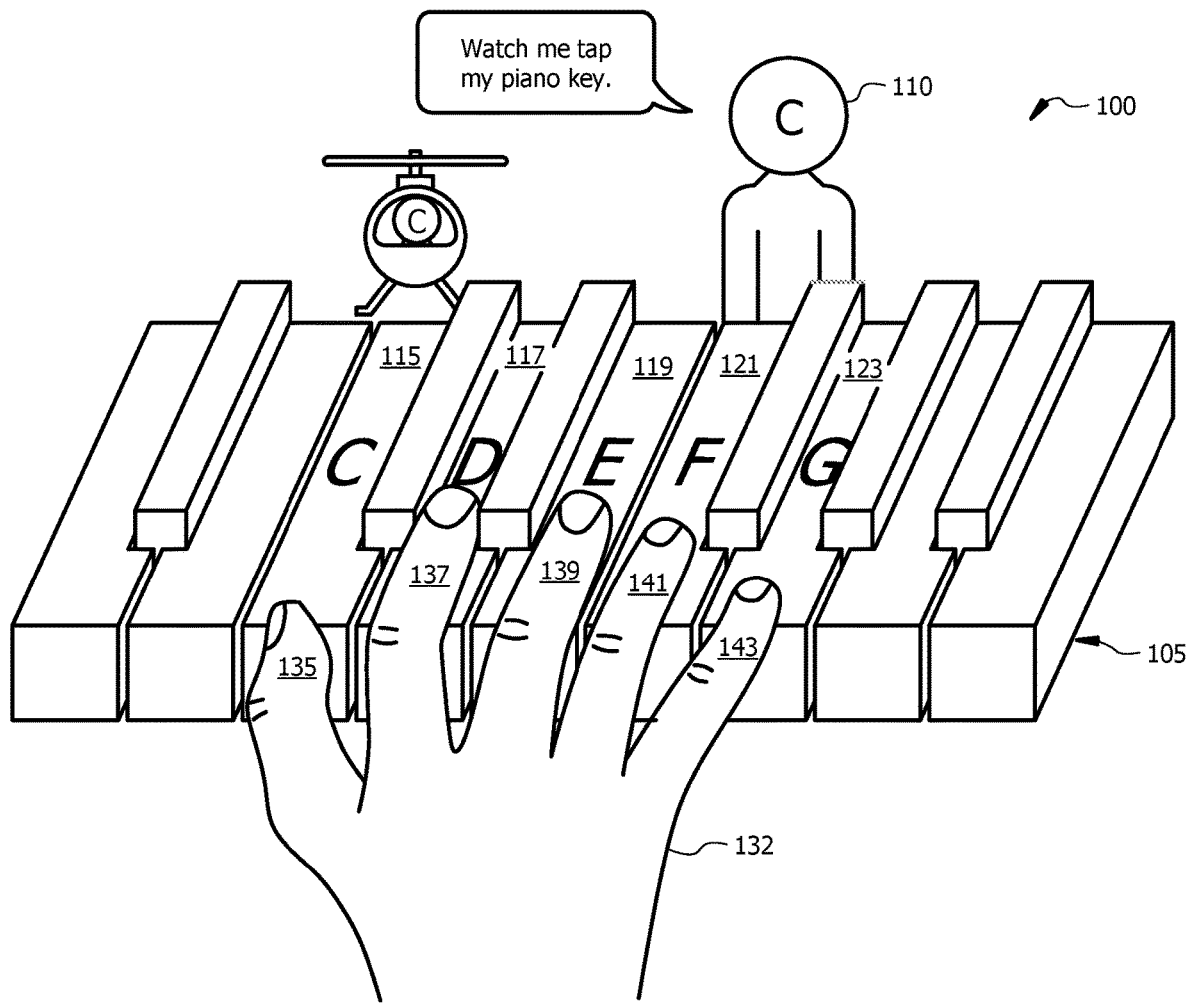
FIG. 4 is a diagram illustrating an embodiment of the present invention showing proper hand positioning relative to the musical instrument image.

As shown in FIG. 4, the method of the present invention additionally includes displaying an image of a hand 132 positioned on the musical instrument image 105 that is displayed on the visual display 100 of the electronic device. The hand 132 is positioned to exemplify the correct location of the fingers for an individual playing the musical instrument shown in the musical instrument image 105. As such, in the case of the keyboard shown in FIG. 4, the hand 132 is positioned such that the thumb 135 of the right hand is on the "C" key 115, the index finger 137 is on the "D" key 117, the middle finger 139 is on the "E" key 119, the ring finger 141 is on the "F" key 121 and the pinkie finger 143 is on the "G" key 123. The thumb 135 may then be moved to simulate the pressing of the "C" key 115 in addition to providing a visual prompt such as, "Watch me tap my piano key", which is attributed to the animated character 110.

Figure 5:
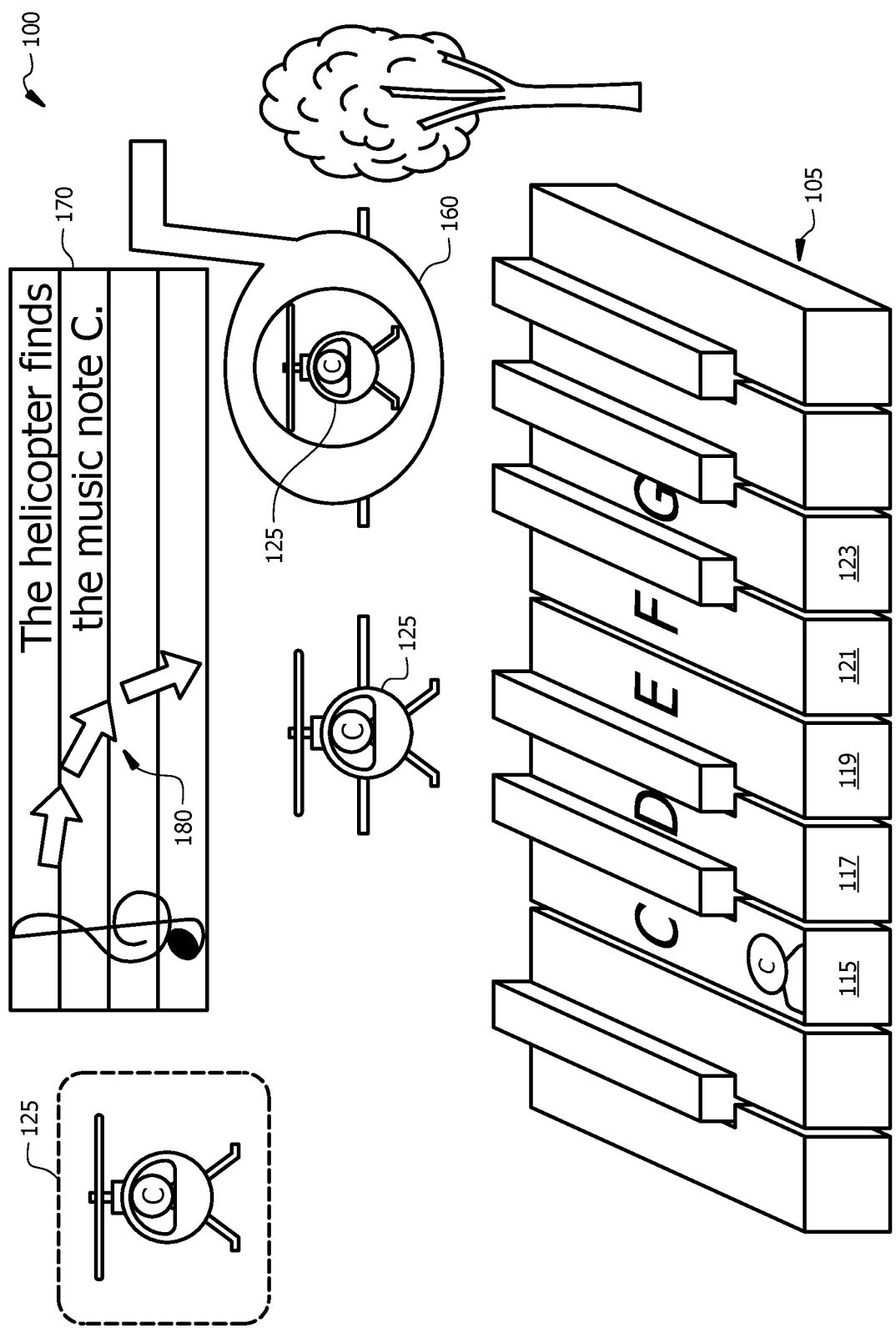
FIG. 5 is a diagram illustrating an embodiment of the present invention showing the transformation of the animated character to an animated music note.

As illustrated in FIG. 5, after the "C" key is illustrated on the visual display 100 as being pressed by the thumb 135 of the image of the hand 132 in FIG. 4, the method of the present invention continues by transforming the movable object 125 into an animated music note 160 comprising the movable object 125. In various embodiment, the movable object 125 may be transformed into a half-note, a quarter-note or a whole-note. As shown in FIG. 5, following the transformation of the movable object 125 into an animated music note 160, the method further includes displaying a movement 180 of the animated music note 160 to be positioned on a musical staff image 170 shown on the visual display 100. The audible sound of the movable object 125 may also be played during the movement 180 of the animated music note 160 and the transformation of the movable object 125 into the animated music note 160. At the end of the movement 180 of the animated music note 160, the animated music note 160 reaches its destination at a positional space or positional line on the musical staff image 170. In this exemplary embodiment, the movable object 125 is a helicopter and the helicopter is shown transforming into an animated musical note 160 which comprises the helicopter. The animated musical note 160 is then displayed as moving 180 to the proper position on the musical staff image 170. As previously described, the sound associated with a helicopter may be played during the transforming of the helicopter to an animated musical note 160 and during the movement of the animated musical note 160 to the musical staff image 170.

In addition to pressing a key on the keyboard to transform the movable object 125 into an animated music note 160 comprising the movable object 125, the method of the present invention may also include providing numerous other visual cues to a student upon pressing a key on the keyboard. For example, pressing a specific key may initiate the sound of a doorbell followed by a visual display of a door opening to a house or other structure positioned within a specific environment, such as along a riverbank, roadway, etc. The character associated with the pressed key may then be displayed leaving the structure through the doorway and into the specific environment to manipulate various objects within the environment or the character may possibly remove objects from the structure and bring them into the environment. The objects may be positioned in overlying relation to the key that was pressed on the visual display to further reinforce the musical notation learning. More specifically, the student may be asked to count the objects that are positioned in overlying relation to the pressed key to further enhance the association of the key with the musical notation.

In another embodiment, one or more keys on the keyboard may be configured to provide a physical action on the visual display. The physical action may include, but is not intended to be limited to, a mechanical switching function, such as unlocking and opening doors, windows, boxes, etc. By depressing a key configured to provide a physical action of the visual display, a student may be provided access to items behind the door or window and/or inside of various boxes. The student is allowed to observe and access the various items to place them relative to the piano and music staff on the visual display to further enhance the association of the key with the musical notation. The ability of the student to retrieve and move objects within the learning environment serves to reinforce the position of the note relative to the musical instrument by allowing the student to place objects of choice in a house, box, net, or top of a key of a keyboard, etc.

Figure 10:
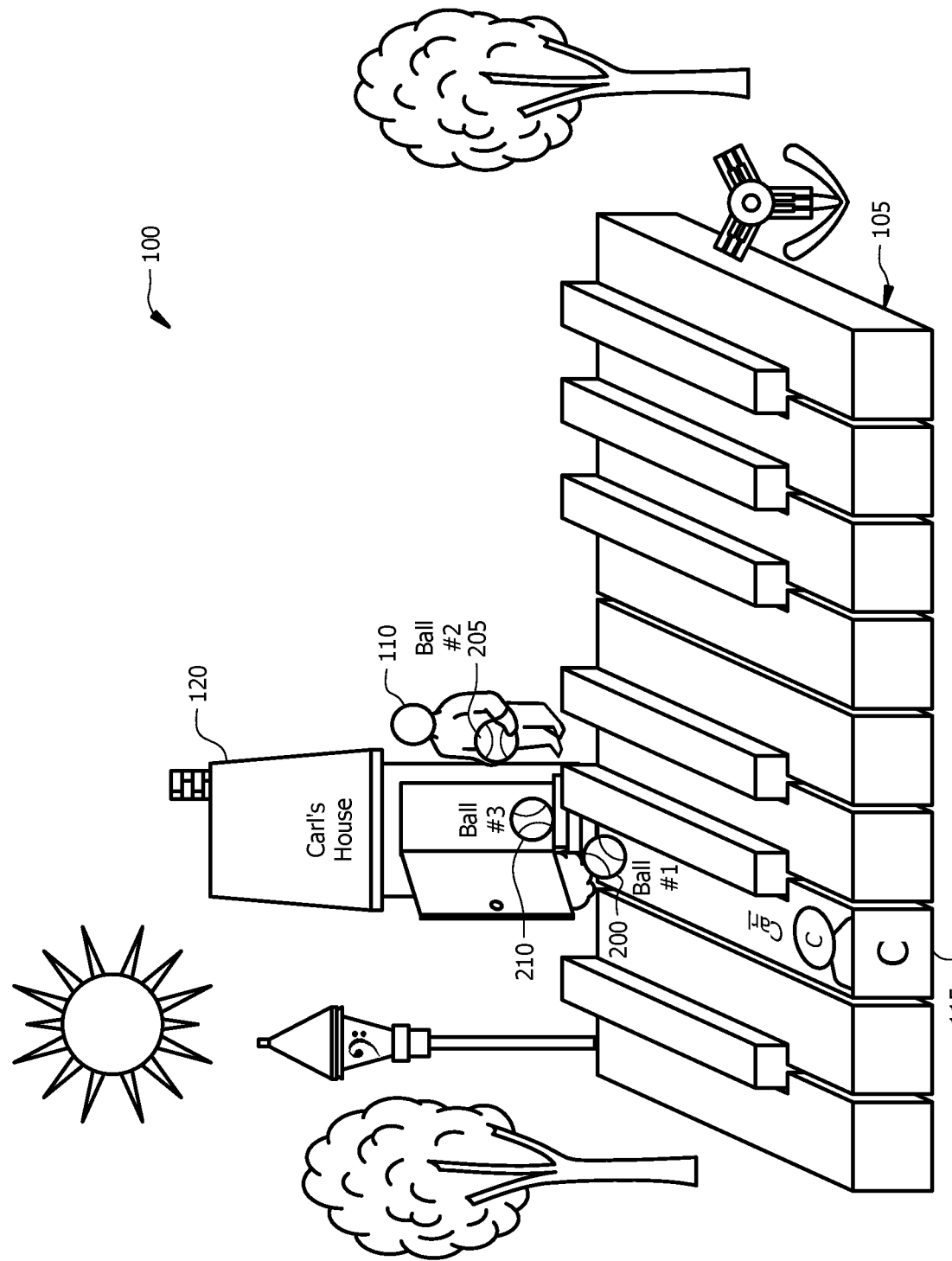
FIG. 10 is an illustration of the inventive concept for providing the student with the ability to interact with the objects within a virtual environment which reinforces the concept of positional learning, in accordance with an embodiment of the present invention.

With reference to FIG. 10, by depressing a key 115 on the keyboard 105, the student may activate the opening of the door to the house 120, thereby exposing the student to a different environment which allows the student to interact with various objects inside the house. In an exemplary embodiment, the actions by the student may cause carl 110 to remove one or more balls 200, 205, 210 from the house 120, count them and place the balls 200, 205, 210 in locations relative to the associated key 115 on the keyboard 105. Providing the student with the ability to interact with the objects within the house reinforces the concept of positional learning.

In general, the various embodiments of the present invention enhance the learning process for locating musical notes on a musical staff image by adding roads, path, lanes, rivers, streams of water, etc. onto which the movable object (such as the helicopter) travels on route to the musical note on the staff image. The method of tracking the musical note introduces the element of suspense and challenges the student to locate and see the proper position of the musical note on the staff. Offering multiple ways and routes to a single position on the staff and providing animation using color varied arrows, lines, etc. to illustrate the tracking route increases the learning aspect for the student. In animated tracking, the tracking of the movable object can be reversed, stopped or controlled for reinforcement and more easily broken-down by the student to gain a clearer understanding between the location of the music note on the keyboard and the corresponding location on the staff. Alternatively, the speed of the tracking can be controlled to adapt to the specific learning characteristics of the student.

In the present invention, in addition to the movable object tracing the musical note from the keyboard to the staff, the invention additionally includes the placement of objects onto the screen to create an environment for the student. For example, a golf green may be positioned on top of a keyboard displayed on the screen. In this embodiment, the movable object may be an action figure that swings a golf club, causing a golf ball to travel into a cup on the golf green and then proceed to the displayed piano keyboard. In another example, the keyboard may be placed in a tree, on a limb of a tree or under a tree house. In this embodiment, a yellow door of the tree house positioned on top of the keyboard may become the focal point to which a movable object interacts with by climbing a ladder to the yellow door of the tree house which is positioned on the yellow piano key which is then activated when the movable object reaches the door via the ladder. As such, in these embodiments, the objects on the screen, such as the golf green and the tree house, provide an interactive environment for the student during the learning process.

In particular, non-movable objects may be displayed to provide a travel path for the movable object, wherein the travel path is a map connecting the musical note on the keyboard to the staff. The travel path, or map, established by the non-movable objects provides the user with an opportunity to retrace the travel path multiple times with the movable object, even after the movable object has reached its destination. The non-movable objects displayed on the screen provide a permanent display of the route which the movable object(s) traverses to its destined musical note on the keyboard of musical staff. The stationary path provided by the non-movable objects displayed on the screen more clearly demonstrates a fixed path for the movable object to traverse again and again, thereby solidifying the relationship between the keyboard and the musical staff in the mind of the user.

Audible sounds may or may not be played during the movement of the objects. For example, if the movable object is a football, since a moving football does not have a sound associated with it, an audible sound may not be provided during the movement of the football. A similar situation would arise for other items, such as golf balls, baseballs, etc. However, in the case when the moving object is a tractor and there is a sound associated with the tractor, the sound of a tractor may be provided to the user. Also, while there may not be audible sounds played that are specifically associated with the movable object, other sounds may be incorporated to enhance the user experience. For example, in the case of a moving football, sounds of a cheering ground in a football stadium may be used to enhance the user experience. Other possibly audible enhancements could include sounds of a creaking ladder when climbing up to a treehouse, creaking doors when opening and closing to access a destination or the sounds of footsteps of the movable object walking up a path to a house. Additionally, when there is a sound associated with the movable object, the audible sound may be representative of the movable object and not the actual sound of the musical note.

Figure 6:
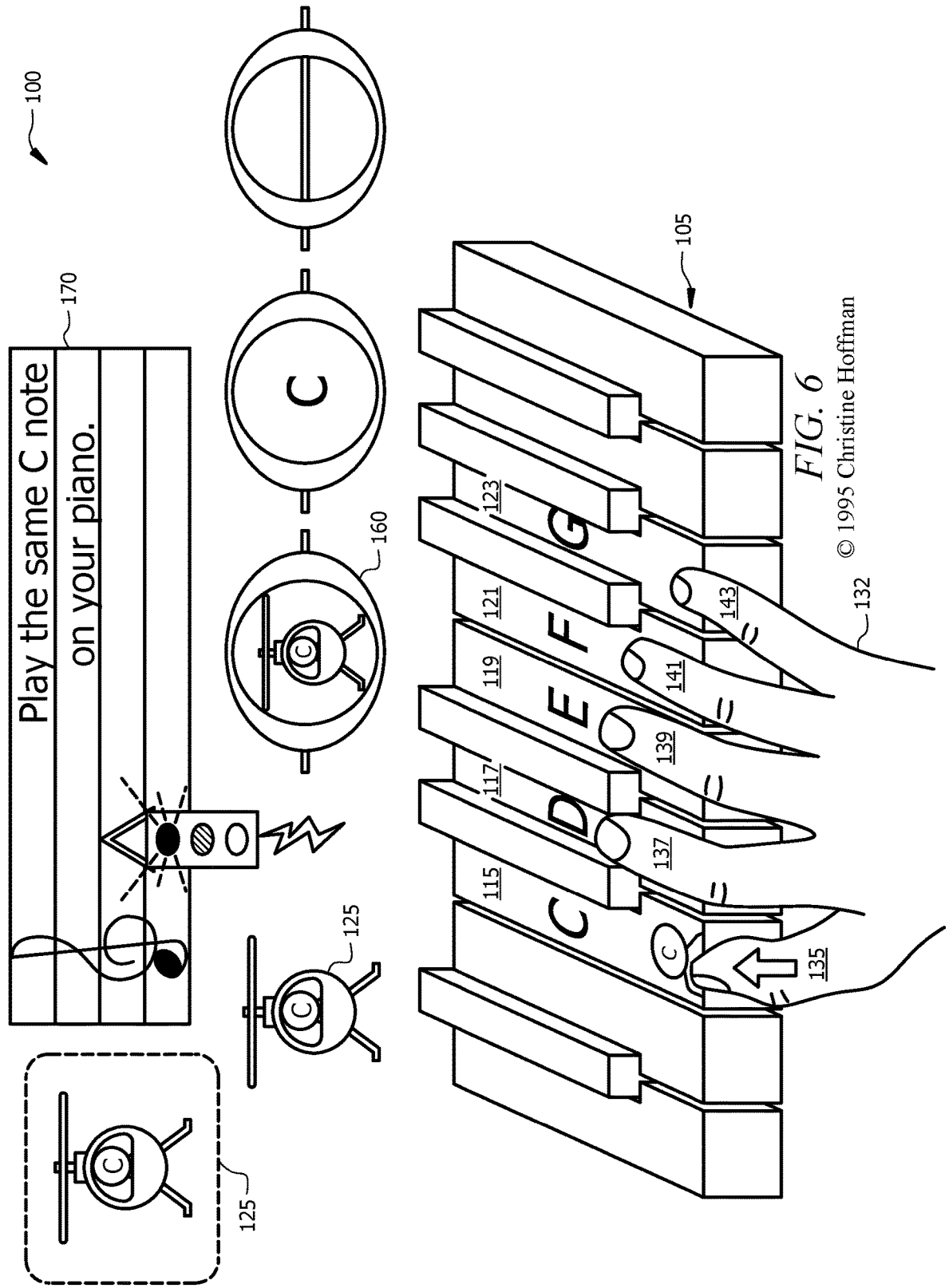
FIG. 6 is a diagram illustrating an embodiment of the present invention showing the depression of the appropriate key on the musical instrument image and the transformation of the animated character to an animated music note on the music staff.

To further reinforce the musical notation learning, the present invention may additionally include a musical interface device with which the learner can physically interact with the electronic device. As shown in FIG. 6, following the transformation of the helicopter to an animated musical note 160, the visual display may instruct the learner to "Play the same C note on your piano". The proper positioning of the fingers of the hand 132 relative to the musical instrument image 105 may additionally be provided to the learner at this step. In this exemplary embodiment the musical interface device is a piano or keyboard.

Figure 7:
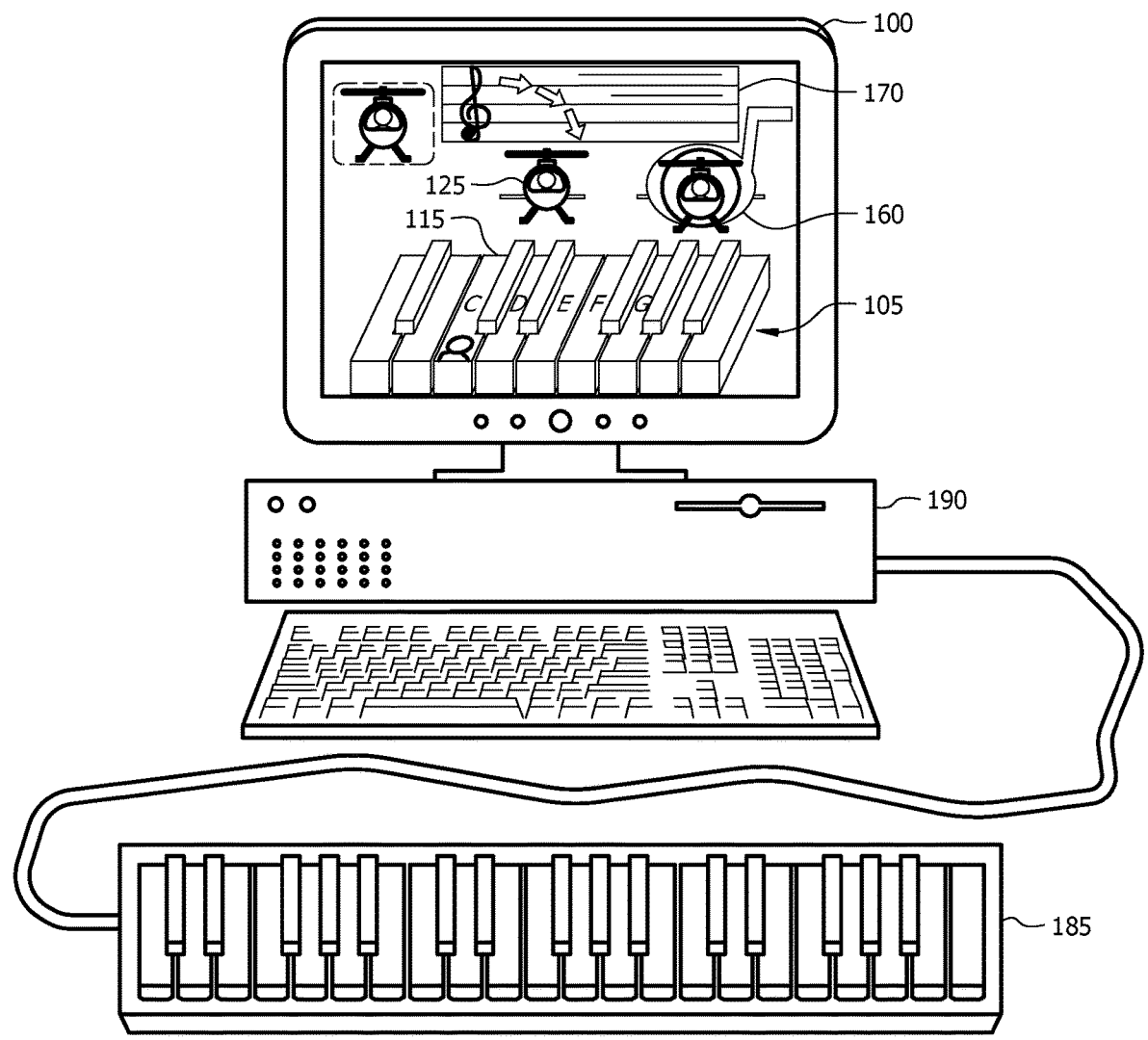
FIG. 7 is an illustration of the electronic device, the visual display and the musical interface device in accordance with an embodiment of the present invention, wherein the musical interface device is a keyboard.

As shown in FIG. 7, a keyboard, or more specifically a MIDI keyboard 185 may be the musical interface device with which the learner can physically interact with the electronic device 190. In this exemplary embodiment, the helicopter 125 associated with Carl and with the musical "C" note may be transformed into an animated musical note 160 and then the animated musical note 160 may be displayed as being flown through the air to arrive at the proper position on the musical staff 170. The learner may then be instructed to physically interact with the keyboard 185 by pressing the corresponding "C" key. The audible sound representation of the helicopter may be played during both the movement of the helicopter and the physical pressing of the "C" key on the keyboard initiated by the leaner.

In a particular embodiment, each key on the keyboard may be based upon a "family name" For example, if the alphabetical name of a music note begins with the letter "J", the music note may be named "The Johnson Family" key. By utilizing a social unit consisting of one or more adults together with the children they care for, the student utilizing the keyboard is able to follow or pursue the track, traces or footprints multiple ways by following the family name.

Figure 8:
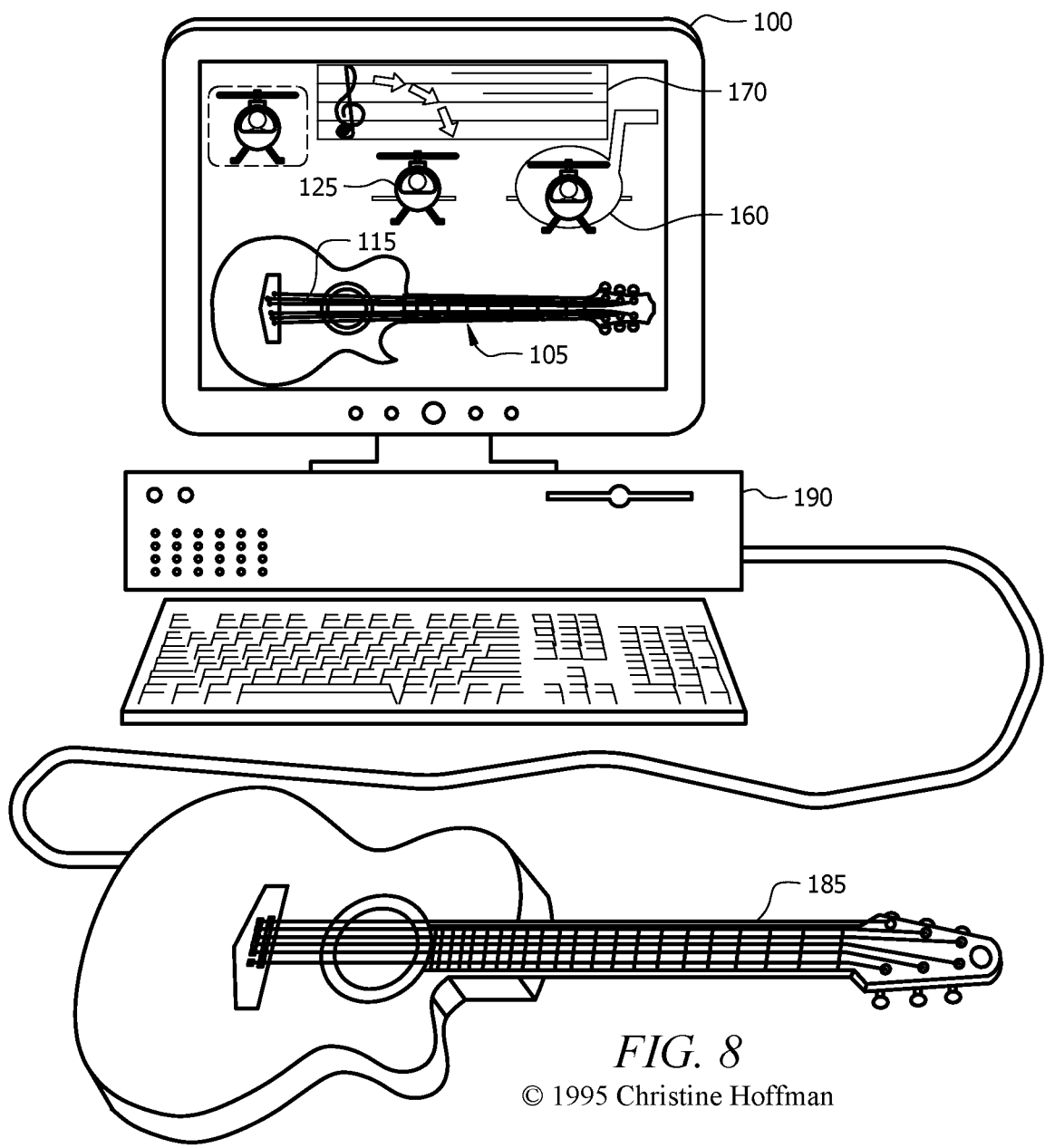
FIG. 8 is an illustration of the electronic device, the visual display and the musical interface device in accordance with an embodiment of the present invention, wherein the musical interface device is a stringed instrument.

As shown in FIG. 8, in another embodiment, the musical interface device 185 may be a stringed instrument, such as a guitar, in communication with the electronic device 190. Various methods are well known in the art for coupling analog and digital musical instruments to electronic device, the details of which is beyond the scope of the present invention.

Additionally, the system for teaching music notation provided by the present invention may be incorporated into one or more video gaming systems known in the art. The incorporation of the methods of the present invention into video gaming systems allows individual learners to be integrated into numerous roll-playing situations. In these roll-playing scenarios, two-dimensional graphics may be provided wherein players of the video gaming systems can control the movement of the music character using commonly known video gaming system controllers. The gaming controllers can be used to cause desired movement of the music character, such as jumping and/or climbing between positions on the musical staff displayed on the screen.

In various video gaming systems envisioned by the present invention, the music related character is challenged to travel through space using step-based controlling techniques which may include traveling in multiple directions to reach the final destination on the piano keyboard or other musical instrument that is associated with the specific note position displayed on the musical score. The incorporation of the inventive concepts into a video gaming system provides a fun, interactive, experience for the learner where they can visualize the music character in a role of their choosing, giving the learner control of the music character while exploring and eventually discovering a logical relationship between the positional location on a musical instrument and its associated positional note on the musical score. The gaming system user may additionally be provided with the flexibility to select any musical character and any of a variety of possible modes of transportation, thereby allowing the learner to invent their own imaginary environment in which to learn music notation using the methods of the present invention.

Additionally, the system for teaching music notation provided by the present invention may be incorporated into one or more electronic books (eBooks) or board games, as are commonly known in the art.

Figure 9:
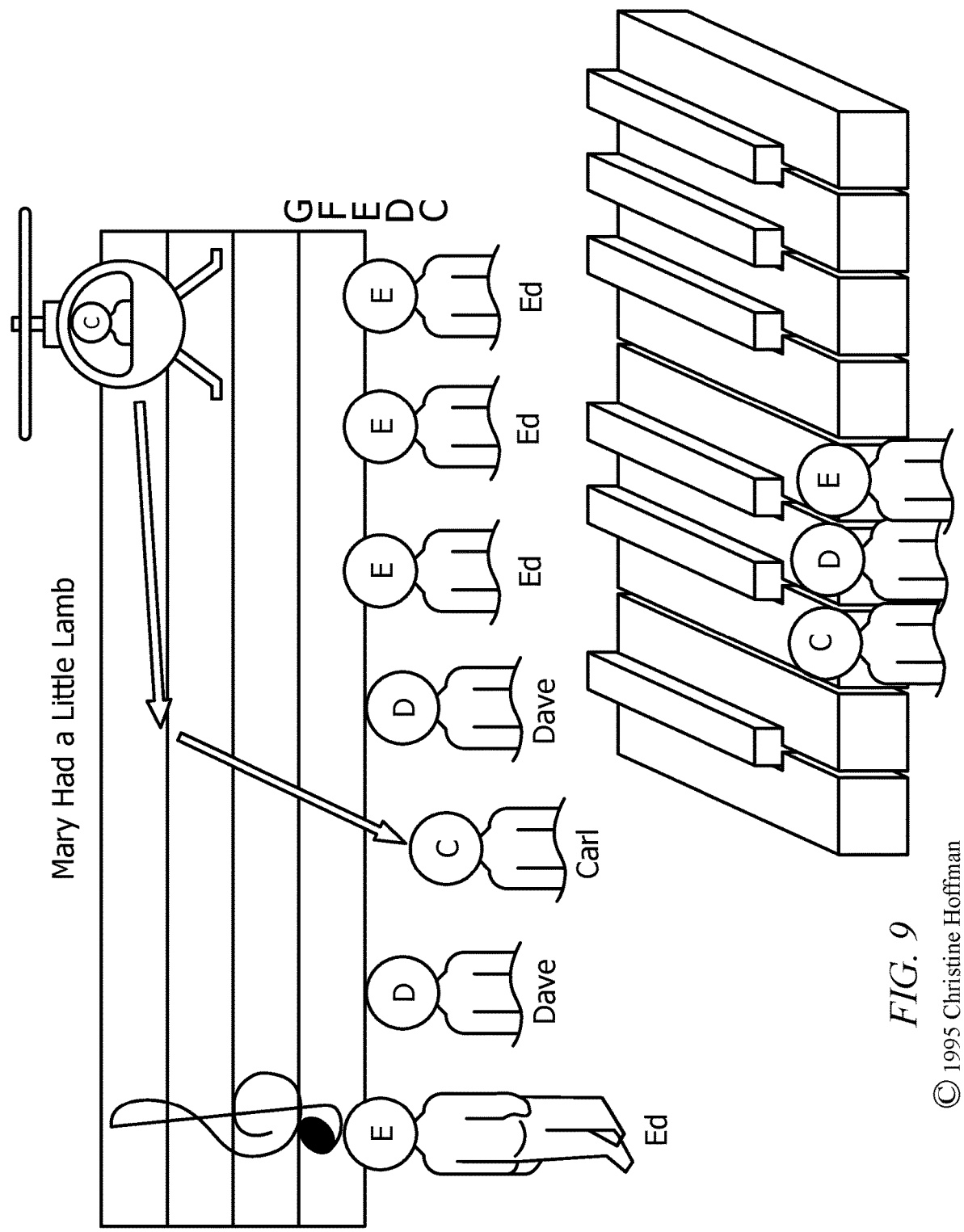
FIG. 9 is an illustration of exemplary sheet music in accordance with an embodiment of the present invention.

For example, in the case of eBooks, sheet music and music scores illustrative of the embodiments of the present invention may be provide, as shown in FIG. 9. As FIG. 9 illustrates, the animated music notes may be morphed into cartoon faces of the character traveling to the music score including lines and spaces. On the staff, the exemplary cartoon face of the animated music note may be placed either between two horizontal lines, or on a horizontal line in the score. The object or cartoon face may additionally include roll playing headgear and below the cartoon face representing the music note the physical structure and material substance of an animal or character may be displayed.

Figure 11:
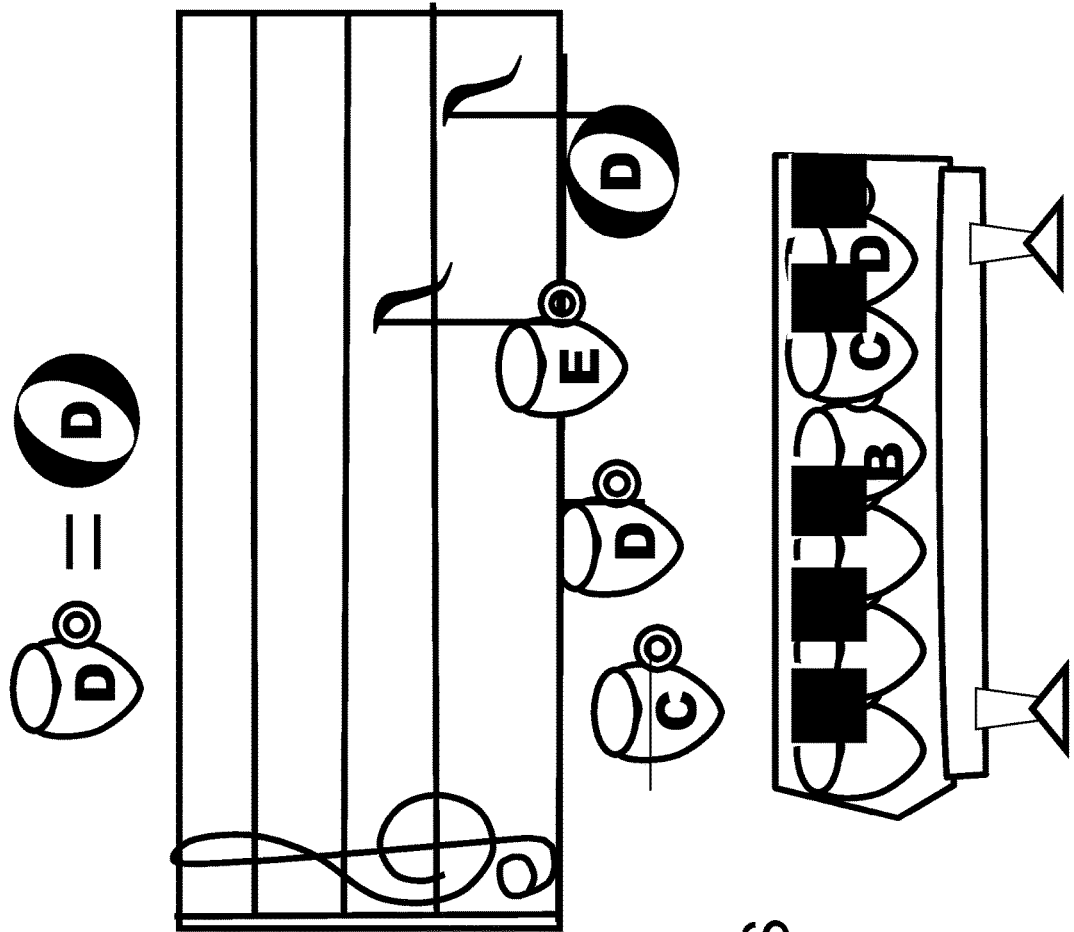
FIG. 11 is an illustration of an exemplary keyboard having keys in the form of a children's toy having piano keys shaped like houses, teacups, in accordance with an embodiment of the present invention.

As illustrated in FIG. 11, in an additional embodiment, the keyboard may be in the form of a children's toy having piano keys shaped like houses, teacups, sport balls, sport related equipment, such as footballs and baseball mitts to further peak a child's imagination as they track and follow the trail of the musical note. Additionally, stickers representing these various objects may be placed on the keyboard keys. This brief listing of objects is not intended to be limiting and any other key shapes and stickers are within the scope of the present invention.

In various embodiments, the present invention improves the ability of music notation learners to make a mental connection between note locations on a musical staff and the same named note connections on a musical instrument, such as a keyboard.

Improved learning is attained through repetitious tracking and the use of multisensory input, including audio sounds that are not related to the sounds of the actual musical instrument. The learner visually sees and hears the movement of the musical notes through a virtual environment which has been shown to keep their attention during the learning process. In various embodiments, the present invention establishes movement of an object through a series of organized activities, initiated by a user, toward an end and the moving parts of the learning mechanism transmit definite motion during the learning process.

HARDWARE AND SOFTWARE INFRASTRUCTURE EXAMPLES

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of teaching music notation to a user, the method comprising:
    displaying a musical instrument image and a musical staff image in a virtual environment provided on a visual display of an electronic device;
    displaying a movable object on the visual display, wherein the movable object is associated with a musical note;
    displaying a movement of the movable object to a location on the musical instrument image that is associated with the musical note;
    transforming the movable object into an animated music note comprising the movable object;
    displaying a movement of the animated music note to a location on the musical staff image that is associated with the musical note;
    instructing a user to play, on a musical interface device coupled to the electronic device, the musical note indicated by the location of the movable object on the musical instrument image;
    receiving, at the electronic device, input from the musical interface device in response to the user playing the musical note on the musical interface device; and
    in response to the input received from the musical interface device, displaying the movement of the movable object to the location on the musical instrument image that is associated with the musical note.

2. The method of claim 1, wherein the electronic device is selected from an electronic book (eBook) and a board game.

3. The method of claim 1, wherein the movable object further comprises one or more animated characters.

4. The method of claim 1, further comprising displaying one or more non-movable objects forming one or more travel paths along which the movable object travels on the visual display.

5. The method of claim 4, wherein the one or more travel paths establishes a map for the movable object to travel on the visual display.

6. The method of claim 1, further comprising playing an audible sound during the movement of the movable object, wherein the audible sound is representative of the movable object and is not the sound of the musical note.

7. The method of claim 1, further comprising:
    instructing a user to play, on the musical interface device coupled to the electronic device, the musical note indicated by the location of the movable object on the musical instrument image;
    receiving, at the electronic device, input from the musical interface device in response to the user playing the musical note on the musical interface device; and
    in response to the input received from the musical interface device, displaying the movement of the animated music note to the location on the musical staff image related to the musical note.

8. The method of claim 1, wherein the user is instructed to play the musical note on the musical interface device using a visual command displayed on the visual display of the electronic device or using an audible command from the electronic device.

9. The method of claim 1, wherein the user is instructed to play the musical note on the musical interface device by positioning an image of a hand on the musical instrument image displayed on the visual display of the electronic device.

10. The method of claim 7, wherein the user is instructed to play the musical note on the musical interface device using a visual command displayed on the visual display of the electronic device or using an audible command from the electronic device.

11. The method of claim 1, wherein one or more non-movable objects forming one or more paths are presented on the visual display and in response to the input received from the musical interface device, displaying the movement of the movable object along the one or more paths to the location on the musical instrument image that is associated with the musical note.

12. The method of claim 7, wherein one or more non-movable objects forming one or more paths are presented on the visual display and in response to the input received from the musical interface device, displaying the movement of the movable object along the one or more paths to the location on the musical staff image related to the musical note.

13. The method of claim 1, wherein the musical interface device is selected from a keyboard instrument, a stringed instrument and a wind instrument.

14. The method of claim 3, wherein a type of the animated character is readily identifiable as being related to the musical note.

15. The method of claim 1, wherein the movable object is an animated character, the method further comprising:
    instructing a user to play, on a musical interface device coupled to the electronic device, the musical note indicated by the location of the animated character on the musical instrument image;
    in response to the user playing the musical note indicated by the location of the animated character on the musical instrument image, using the animated character to perform additional activities in the virtual environment provided on the visual display to enhance the association of the musical note on the musical staff image to the location of the musical note on the musical instrument image.

16. A music notation teaching apparatus comprising:
    an electronic device comprising at least a processor and a visual display;
    a computing memory coupled to the processor, the computing memory comprising executable instructions that upon execution by the processor cause the processor to effectuate operations comprising:
    displaying a musical instrument image and a musical staff image in a virtual environment provided on the visual display of the electronic device;
    displaying a movable object on the visual display, wherein the movable object is associated with a musical note;
    displaying a movement of the movable object to a location on the musical instrument image that is associated with the musical note;

transforming the movable object into an animated music note comprising the movable object;

displaying a movement of the animated music note to a location on the musical staff image that is associated with the musical note;

instructing a user to play, on a musical interface device coupled to the electronic device, the musical note indicated by the location of the movable object on the musical instrument image;

receiving, at the electronic device, input from the musical interface device in response to the user playing the musical note on the musical interface device; and in response to the input received from the musical interface device, displaying the movement of the movable object to the location on the musical instrument image that is associated with the musical note.

17. The apparatus of claim 16, wherein the movable object further comprises an animated character.

18. The apparatus of claim 16, further comprising displaying one or more non-movable objects forming one or more paths along which the movable object travels on the visual display.

19. The apparatus of claim 16, further comprising playing an audible sound during the movement of the movable object, wherein the audible sound is representative of the movable object and is not the sound of the musical note.

20. The apparatus of claim 16, wherein the computing memory further comprising executable instructions that upon execution by the processor cause the processor to effectuate operations comprising:

instructing a user to play, on the musical interface device coupled to the electronic device, the musical note indicated by the location of the movable object on the musical instrument image;

receiving, at the electronic device, input from the musical interface device in response to the user playing the musical note on the musical interface device; and in response to the input received from the musical interface device, displaying the movement of the animated music note to the location on the musical staff image related to the musical note.

21. The apparatus of claim 16, wherein the user is instructed to play the musical note on the musical interface device using a visual command displayed on the visual display of the electronic device or using an audible command from the electronic device.

22. The apparatus of claim 16, wherein the user is instructed to play the musical note on the musical interface device by positioning an image of a hand on the musical instrument image displayed on the visual display of the electronic device.

23. The apparatus of claim 19, wherein the user is instructed to play the musical note on the musical interface device using a visual command displayed on the visual display of the electronic device or using an audible command from the electronic device.

24. The apparatus of claim 16, wherein the musical interface device is selected from a keyboard instrument, a stringed instrument and a wind instrument.

25. The apparatus of claim 17, wherein a type of the animated character is readily identifiable as being related to the musical note.

26. The apparatus of claim 16, wherein the musical interface device is a keyboard instrument and wherein one or more keys of the keyboard instrument are shaped to represent the movable object.

27. The apparatus of claim 16, wherein the musical interface devices is configured to initiate the simulation of a physical action on the visual display.

28. One or more non-transitory computer-readable media having computer-executable instructions for performing a method of running a software program on an electronic device, the electronic device operating under an operating system, the method including issuing instructions from the software program comprising:

displaying a musical instrument image and a musical staff image in a virtual environment provided on a visual display of an electronic device;

displaying a movable object associated on the visual display, wherein the movable object is associated with a musical note;

displaying a movement of the movable object to a location on the musical instrument image that is associated with the musical note;

transforming the movable object into an animated music note comprising the movable object;

displaying a movement of the animated music note to a location on the musical staff image that is associated with the musical note;

instructing a user to play, on a musical interface device coupled to the electronic device, the musical note indicated by the location of the movable object on the musical instrument image;

receiving, at the electronic device, input from the musical interface device in response to the user playing the musical note on the musical interface device; and in response to the input received from the musical interface device, displaying the movement of the movable object to the location on the musical instrument image that is associated with the musical note.

* * * * *